United States Patent

Testa et al.

[11] 4,281,257
[45] Jul. 28, 1981

[54] WAVE POWERED GENERATOR

[76] Inventors: Victor Testa, c/o George Spector 3615 Woolworth Bldg., 233 Broadway; George Spector, 3615 Woolworth Bldg., 233 Broadway, both of New York, N.Y. 10007

[21] Appl. No.: 7,464

[22] Filed: Jan. 29, 1979

[51] Int. Cl.³ .............................................. F03B 13/12
[52] U.S. Cl. ...................................... 290/42; 290/53; 417/343
[58] Field of Search .................................. 290/42, 53; 417/330–337, 341, 343

[56] References Cited

U.S. PATENT DOCUMENTS

| 1,244,309 | 10/1917 | Fox | 417/332 |
| 1,555,487 | 9/1925 | Sauer et al. | 417/331 |
| 1,639,956 | 8/1927 | Nash | 417/335 |
| 1,864,499 | 6/1932 | Grigsby | 290/42 X |
| 4,111,610 | 9/1978 | Brown | 290/53 X |

Primary Examiner—J. V. Truhe
Assistant Examiner—W. E. Duncanson, Jr.

[57] ABSTRACT

A machine that includes a tank in which air is compressed so the air is used to drive an electricity generating mechanism that includes an air grinder or air turbine powering an alternator in an electric circuit, and the air compressor being driven by natural forces such as ocean waves.

2 Claims, 3 Drawing Figures

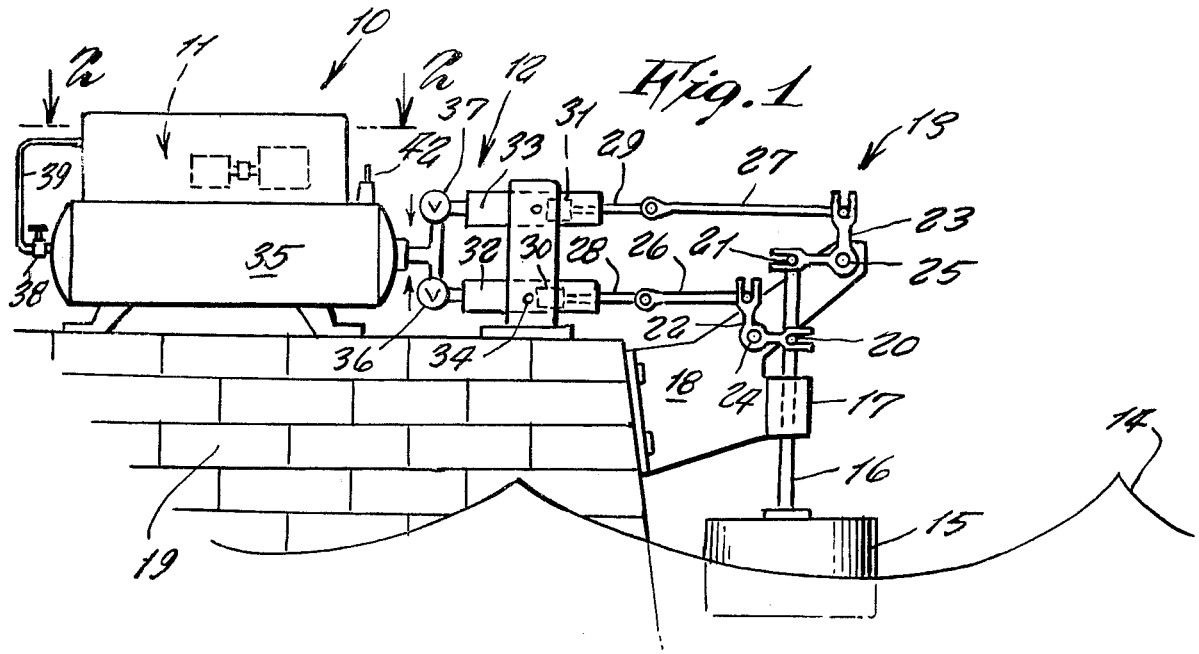

WAVE POWERED GENERATOR

This invention relates generally to electricity generators.

A principal object of the present invention is to provide an electricity generator that does not require the expenditure of fuels for being run so that electricity is produced free, with exception of the costs for maintaining the device in an operating condition.

Another object accordingly is to provide an electricity generator which, besides conserving on fuel energy, eliminates pollution of the environment caused by burning of fuels.

FIG. 1 is a side view of the present AIR TO ELECTRICITY POWER MACHINE, showing in a coastal installation so to use both up and down ocean wave movement energy for developing an initial air pressure inside the air tank for starting up the machine, and providing operating power therefor.

FIG. 2 is a cross sectional view on line 2—2 of FIG. 1 and showing the components of the machine located within the case on top of the compressed air storage tank.

FIG. 3 is an end view of the machine.

Referring now to the drawing in greater detail, the reference numeral 10 represents an electricity generator, according to the present invention, wherein there is an electrical system 11 that is powered by compressed air from an air compressor 12 activated by a mechanical mechanism 13 powered by natural forces. The compressed air system between the input and output of the machine permits convenient communication between these ends which is preferable in certain instances instead the direct connection between input and output.

The input of the design shown in the drawing, is made for harnessing the motion of ocean waves 14. A hollow float 15 includes an upward extending shaft 16 slidable in a stationary sleeve 17 of a steel plate 18 rigidly affixed to a coastal breakwater 19 or the like. Pins 20 and 21 along the shaft engage angle levers 22 and 23 respectively. The levers pivot on pins 24 and 25 mounted in plate 18. The levers are connected, the levers activate linkages 26 and 27 connected to piston rods 28 and 29 of pistons 30 and 31 in cylinders 32 and 33 having air inlet ports 34.

In operation, when the float ascends on a wave, the piston 30 pushes air into air tank 35, and when the float descends on a wave, the piston 31 pushes air into the air tank 35. Thus the rise and fall of a wave is harnessed to produce useful work. One way valves 36 and 37 prevent return air escane from the tank.

Working pressure in the tank is 150 lbs. per inch. To do this, an air valve 38 along pipe 39 is closed. Switches 40 and 41 are turned off. Now the tank is filled with air under pressure. A safety valve 42 limits the pressure. The switch is released to cut off power. The valve 38 is opened and air from the tank is forced into the air grinder 43. A pulley 44 on the air grinder is connected by belt 45 to a larger pulley 46 on alternator 47 of 70 amps. to produce D.C. power. Alternator 47 is connected by conductor 48 to switch 40, from where current is carried to voltmeter 49, fuse box 50 and power converter 51.

Before turning switch 41, the circuit from fuse box 50A toward unit 55 is checked out.

From fuse box 50A, electric current flows to motor 52 which by means of an arrangement of pulleys and belt drives an alternator 53, and from there to a converter 60 and then to a motor 54 connected by pulleys and belt to a unit 55.

Current from switch 40 then moves through switch 41 to the D.C. motor 56 and air compressor pump 57 for auxillary air pressure purpose.

An auxillary battery operated circuit is shown at 58.

What is claimed:

1. A machine for converting wave energy to electrical energy comprising a float responsive to wave action causing reciprocating up and down float motion a first means connected to the float along its vertical axis and to parallel rods causing opposing motion of said rods, each said rod connected to a piston mounted in a cylinder which in turn is connected to compressed air tank, including a check valve between each cylinder and said tank in further combination with a second means for operating an electric generator by the compressed air in said tank, wherein the first said means comprise a pair of linkages connected to the float at spaced points, each said linkage attached to each said rod, wherein one of said linkages includes a pivot point secured to a fixed member on one side of said float axis and the other of said linkages includes a pivot point secured to said fixed member at the opposite side of said float axis whereby vertical reciprocal float motion causes opposing rod motion and air compression in at least one cylinder on both up and down float motion.

2. The combination of claim 1 wherein the second said means includes an air turbine driving a pair of pulleys which in turn drive an alternative connected to an electric circuit including a trouble switch fuse box, alternator motor combinations, an auxiliary air compressor pumps and storage battery.

* * * * *